Patented Dec. 14, 1948

2,456,443

UNITED STATES PATENT OFFICE 2,456,443

PROCESS FOR PREPARING NORDIHYDROGUAIARETIC ACID AND INTERMEDIATES

George P. Mueller, Eric T. Stiller, and Samuel V. Lieberman, Philadelphia, Pa., assignors to Wyeth Incorporated, Philadelphia, Pa., a corporation of Delaware No Drawing. Application December 6, 1946, Serial No. 714,658

8 Claims. (Cl. 260—338)

This invention relates in general to the process for preparing nordihydroguaiaretic acid and intermediates and more particularly to the synthesis of 2,3-bis(3,4-dihydroxybenzyl)-butane otherwise identified as nordihydroguaiaretic acid and the intermediate 2,3-bis(3,4-carbonyldioxybenzyl)-butane.

Nordihydroguaiaretic acid is of practical interest as an antioxidant and useful in preserving edible fats and oils. It is obtained for that purpose by the alkaline extract of dried plants of the species *Larrea divaricata*. Since the extraction of nordihydroguaiaretic acid from natural sources is a relatively expensive procedure, and since the product obtained is quite impure, the art has sought for a method of synthesizing this compound from easily available starting material which method is competitively practical and yields a product in substantially pure form.

This invention involves the synthesis of 2,3-bis(3,4-carbonyldioxybenzyl)-butane and nordihydroguaiaretic acid in substantially pure crystalline form from easily procurable and relatively inexpensive starting material.

The process of invention uses as a starting compound 3,4-methylenedioxyallylbenzene commonly known as safrole (I). This material is treated with hydrogen bromide to form a safrolehydrobromide or alpha-(3,4-methylenedioxyphenyl)-beta-bromopropane (II), which may be illustrated by the following equation:

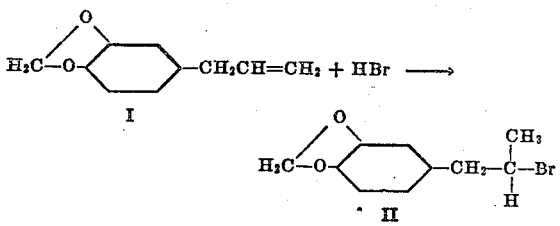

By a coupling reaction, two molecules of the resulting safrolehydrobromide are united to form 2,3-bis (3,4 - methylenedioxybenzyl) - butane or 2,3-dipiperonylbutane having the formula

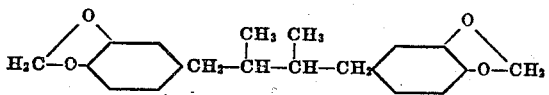

which in turn is chlorinated to form 2,3-bis(3,4-dichloromethylenedioxybenzyl) - butane which may be illustrated by the formula

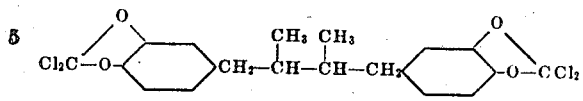

The latter compound may be hydrolyzed with water forming the desired product 2,3-bis(3,4-dihydroxybenzyl)-butane or nordihydroguaiaretic acid which may be represented by the formula

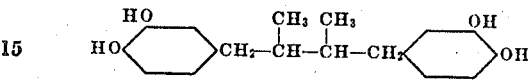

In order to obtain a purer product, it is best to hydrolyze 2,3-bis(3,4 - dichloromethylenedioxybenzyl)-butane to 2,3-bis(3,4-carbonyldioxybenzyl)-butane under mild alkaline conditions and isolate the latter compound. This compound can be illustrated by the formula

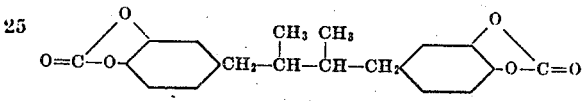

After separation, the 2,3-bis(3,4-carbonyldioxybenzyl)-butane may then be treated under mild acid hydrolysis conditions to form the desired nordihydroguaiaretic acid.

The coupling of two molecules of safrolehydrobromide may be carried out by a number of different procedures and among which, the formation of a Grignard reagent from the hydrobromide is the preferred route. The coupling of safrolehydrobromide itself may be carried out in a suitable non-aqueous medium such as benzene or decahydronaphthalene by means of a suspension of sodium or copper bronze. In coupling by use of the Grignard reagent the reaction is carried out in the presence of anhydrous cobaltous chloride, iodine or silver bromide using anhydrous ethyl ether as the solvent. It has been found that iodine is the best coupling agent in view of the superior yields obtained with this substance.

The following procedures illustrate the invention.

*Preparation of alpha-(3,4-methylenedioxyphenyl)-beta-bromopropane or "safrolehydrobromide"*

250 grams of safrole and 200 grams of hydrobromic acid (42%) were placed in a column with a gas inlet tube extending to near the bottom of the column which was surrounded by an ice-salt bath. Hydrobromic acid gas was bubbled through a sulfuric acid wash bottle and then into the reaction mixture for four hours after which the gas was shut off, the inlet and exit tubes stoppered, and the apparatus left at about 4° C. overnight. The dark purple reaction mixture was diluted with 500 ml. cold, saturated brine and 300 ml. ethyl ether. The dark red organic layer was separated and the aqueous layer was extracted with two 200 ml. portions of ethyl ether. The ether solution was washed with saturated brine and dried. The ether was removed under reduced pressure leaving a dark red liquid which was fractionally distilled. The colorless safrolehydrobromide was collected in good yield at 154–158° C. at a pressure of 13–14 mm.

*Preparation No. 1 of 2,3-dipiperonylbutane*

2.43 grams of magnesium were placed in a 500 ml. 3-necked, round bottom flask fitted with an addition tube connected to a tank of nitrogen, an air-sealed stirrer, and a reflux condenser with a calcium chloride tube. The magnesium and the apparatus were dried by warming with a flame while passing a stream of nitrogen. After cooling, 50 ml. of dry ethyl ether was placed in the flask and 24.3 grams of safrolehydrobromide dissolved in 75 ml. dry ether was placed in the addition tube. The nitrogen was shut off and dropwise addition begun. After activating with a crystal of iodine and a small flame, the reaction started and stirring was begun. The dropwise addition was regulated to keep the ether refluxing gently; complete addition required about 30 minutes. The reaction contents were refluxed for one hour. 12.7 grams of iodine in 75 ml. dry ethyl ether was placed in the addition tube and added dropwise to the reaction while continuing the stirring. The pale yellow solution decolorized each drop. The rate of addition maintained gentle refluxing and all the magnesium remaining as a small residue went into solution. On complete addition, the reaction was refluxed one additional hour and then cooled with an ice bath to 10° C. A solution of 10 ml. concentrated hydrochloric acid in 100 ml. water was added slowly, keeping the temperature below 15° C. The layers were separated, the aqueous layer extracted twice with ether, the ether solutions combined and washed with brine, sodium carbonate solution (10%) and brine and then dried. The ether was removed under reduced pressure and the residual amber liquid fractionally distilled. The 2,3-dipiperonylbutane was separated as a light amber, very viscous oil fraction at 160°–210° C. at a pressure of 0.5 mm.

Analysis: Calculated—C, 73.62; H, 6.75. Found—C, 73.50; H, 6.94.

*Preparation No. 2 of 2,3-dipiperonylbutane*

The Grignard reagent was prepared in the same manner as described in the foregoing procedure. After the hour of additional heating at reflux, 18.8 g. (0.1 mole) of silver bromide was added portionwise with continued stirring; black metallic silver was deposited and the heat of reaction maintained refluxing. Heating was continued for an hour after the last addition, the mixture then being cooled to 10° C. A solution of 10 ml. concentrated hydrochloric acid in 100 ml. of water was added slowly, keeping the temperature below 15° C. and the mixture was then filtered. The filtrate was separated into an aqueous and an ether phase, the aqueous phase being extracted twice with ether and the ether solutions were then combined. The ether solutions were washed with water, 10% sodium bicarbonate solution, saturated sodium chloride solution and dried over anhydrous magnesium sulfate. The ether was removed under reduced pressure and the residual liquid fractionally distilled. A fraction boiling at 175–210° C. at a pressure of 0.5 mm. was separated as a pale-yellow viscous liquid which was found to have the same properties as 2,3-dipiperonylbutane.

*Preparation of 2,3-bis(3,4-carbonyldioxybenzyl)-butane*

3.5 grams of 2,3-dipiperonylbutane was dissolved in 15 ml. of toluene in a 50 ml. flask fitted with a reflux condenser and calcium chloride tube. 14 grams of phosphorous pentachloride was added forming a dark red color which gradually lightened to pale amber during three hours refluxing. The reaction mixture was cooled and poured slowly with stirring into 300 ml. of ice water saturated with sodium carbonate. The 2,3-bis(3,4-carbonyldioxybenzyl)-butane was collected as a white solid which was filtered, washed with cold water, and dried in vacuo at 50° C. An additional amount of solid was obtained from the toluene layer. After two recrystallizations from toluene, the melting point of the product was found to be 171.5°–173° C. (Kofler, cor.).

Analysis: Calculated—C, 67.80; H, 6.75. Found—C, 67.53; H, 5.41.

*Preparation of 2,3-bis(3,4-dihydroxybenzyl)-butane*

0.68 gram of 2,3-bis(3,4-carbonyldioxybenzyl)-butane was placed in a 100 ml. flask fitted with a condenser and a tube extending to the bottom of the flask through which a stream of nitrogen was passed. 50 ml. of one normal hydrochloric acid in aqueous methanol (80%) was added, and the reaction refluxed on a water bath. The solid dissolved slowly, solution being complete in 1.5 hours. Refluxing was continued one additional hour. The solvent was removed under reduced pressure leaving a pale yellow viscous oil which was dissolved in 10 ml. hot benzene. On cooling, a solid was deposited. The solid was separated by centrifuging and decanting, and then recrystallized from a mixture of one ml. ethyl acetate and two ml. pentane as a gray solid mass of nordihydroguairaretic acid melting at 185°–186° C. (Kofler, cor.). The mixed melting point with natural nordihydroguaiaretic acid was 185°–186° C. (Kofler, cor.).

The procedures outlined above are to be regarded as illustrative and not limitative of the invention. As indicated above, various methods of coupling safrolehydrobromide or the Grignard reagent are available. In the chlorination step while phosphorous pentachloride is preferred, other chlorinating agents are contemplated such as phosphorous pentabromide, sulfur halides, for example, thionylchloride and aluminum halides particularly aluminum bromide. As indicated above, the dichloro intermediate may be hydrolyzed in a number of ways. While the specific examples disclose an alkaline hydrolysis followed by an acid hydrolysis, this procedure is not necsary. The dichloro intermediate may be merely hydrolyzed in an aqueous solution ranging from neutral to alkaline in pH. Since neutral hydrolysis of this compound forms hydrochloric acid in solution, acidic hydrolysis automatically follows, resulting in the desired nordihydroguaiaretic acid. In order to obtain a purer product, it is preferred to isolate 2,3-bis(3,4-carbonyldioxybenzyl)-butane and the procedure as indicated in the specific examples is preferred. If the alkaline hydrolysis step is carried out, dilute sodium carbonate, or bicarbonate, dilute sodium hydoxide in a nitrogen atmosphere, the corresponding potassium compounds, or aqueous organic bases such as aqueous pyridine are contemplated. With regard to the acid hydrolysis, it is of course obvious that any well-known mineral acid may be used such as hydrochloric acid, sulfuric acid, etc.

We claim:

1. The process of preparing nordihydroguaiaretic acid comprising reacting safrole with hydrogen bromide to form 1-piperonyl-1-bromethane, coupling two molecules of the latter compound to form 2,3-dipiperonylbutane, halogenating the 2,3-dipiperonylbutane and then hydrolyzing the reaction product to form nordihydroguaiaretic acid.

2. The process of claim 1; wherein the halogenating step is carried out by reacting 2,3-dipiperonylbutane with a chlorinating agent which is then followed by an hydrolysis step.

3. The process of claim 1; wherein the halogenating and hydrolysis steps are carried out by reacting 2,3-dipiperonylbutane with a chlorinating agent followed by an alkaline to neutral and finally an acid, hydrolysis.

4. The process of preparing nordihydroguaiaretic acid comprising reacting safrole with hydrogen bromide to form 1-piperonyl-1-bromethane, reacting the latter compound with magnesium to form the corresponding Grignard reagent, reacting the Grignard reagent with a coupling agent to form 2,3-dipiperonylbutane, halogenating the 2,3-dipiperonylbutane and then hydrolyzing the reaction product to form nordihydroguaiaretic acid.

5. The process of preparing nordihydroguaiaretic acid comprising reacting 1-piperonyl-1-bromethane with magnesium to form the corresponding Grignard reagent, reacting the Grignard reagent with a coupling agent to form 2,3-dipiperonylbutane reacting the latter with phosphorus pentachloride, treating the reaction product with an aqueous alkaline solution to form 2,3-bis(3,4-carbonyldioxybenzyl)-butane and reacting the latter with an aqueous acid solution to form 2,3-bis(3,4-dihydroxybenzyl)-butane.

6. The process of preparing nordihydroguaiaretic acid comprising reacting safrole with hydrogen bromide to form 1-piperonyl-1-bromethane, reacting the latter compound to form the corresponding Grignard reagent, treating the latter in the presence of iodine to form 2,3-dipiperonylbutane, reacting 2,3-dipiperonylbutane to form 2,3-bis(3,4-carbonyldioxybenzyl)-butane and hydrolyzing the latter to form nordihydroguaiaretic acid.

7. The process of preparing 2,3-bis(3,4-carbonyldioxybenzyl)-butane comprising reacting safrole with hydrogen bromide to form 1-piperonyl-1-bromethane, reacting the latter compound with magnesium to form the corresponding Grignard reagent, treating the Grignard reagent with iodine to form 2,3-dipiperonylbutane, reacting the latter with a chlorinating agent and treating the reaction product with a dilute alkaline solution to form 2,3-bis(3,4-carbonyldioxybenzyl)-butane.

8. The new compound, 2,3-bis(3,4-carbonyldioxybenzyl)-butane.

GEORGE P. MUELLER.
ERIC T. STILLER.
SAMUEL V. LIEBERMAN.

REFERENCES CITED

The following references are of record in the file of this patent:

UNITED STATES PATENTS

| Number | Name | Date |
|---|---|---|
| 2,272,153 | Moyle | Feb. 3, 1942 |
| 2,421,118 | Gisvold | May 27, 1947 |